US008282053B2

(12) United States Patent
Mensching

(10) Patent No.: US 8,282,053 B2
(45) Date of Patent: Oct. 9, 2012

(54) APPARATUS FOR ADJUSTING THE LENGTH OF A BOAT LIFT LEG

(76) Inventor: Herman E. Mensching, Missouri Valley, IA (US)

(*) Notice: Subject to any disclaimer, the term of this patent is extended or adjusted under 35 U.S.C. 154(b) by 456 days.

(21) Appl. No.: 12/589,347

(22) Filed: Oct. 22, 2009

(65) Prior Publication Data

US 2011/0095147 A1 Apr. 28, 2011

(51) Int. Cl.
*F16M 11/26* (2006.01)

(52) U.S. Cl. .................................. 248/125.2; 248/188.4

(58) Field of Classification Search .................. 248/121, 248/122.1, 125.1, 125.2, 188.1, 188.2, 188.4, 248/188.5

See application file for complete search history.

(56) References Cited

U.S. PATENT DOCUMENTS

| | | | | |
|---|---|---|---|---|
| 3,844,578 | A * | 10/1974 | Matyskella et al. | 280/43.22 |
| 5,482,401 | A | 1/1996 | Spisak | |
| 5,863,353 | A * | 1/1999 | Snipe, Jr. | 134/42 |
| 6,655,645 | B1 * | 12/2003 | Lu et al. | 248/176.1 |
| 6,709,194 | B1 * | 3/2004 | Grimes | 404/96 |
| 7,004,043 | B2 * | 2/2006 | Erel et al. | 74/89.23 |
| 7,059,803 | B2 | 6/2006 | Floe et al. | |
| 7,168,665 | B2 * | 1/2007 | Hong et al. | 248/125.1 |
| 2008/0116330 | A1 * | 5/2008 | Cotto | 248/188.4 |

* cited by examiner

*Primary Examiner* — Terrell McKinnon
*Assistant Examiner* — Steven Marsh
(74) *Attorney, Agent, or Firm* — Dennis L. Thomte; Thomte Patent Law Office LLC

(57) ABSTRACT

An apparatus for adjusting the length of a leg of a boat lift is described wherein the length of the leg may either be shortened or lengthened without the necessity of entering the water in which the boat lift is positioned.

6 Claims, 4 Drawing Sheets

APPARATUS FOR ADJUSTING THE LENGTH OF A BOAT LIFT LEG

BACKGROUND OF THE INVENTION

1. Field of the Invention

This invention relates to an apparatus for adjusting the length of a boat lift leg and more particularly to an apparatus for adjusting the length of a boat lift leg which may be used to either lengthen the boat lift leg or shorten the boat lift leg, with the same being operated from above the surface of the water in which the boat lift is positioned.

2. Description of the Related Art

Many types of boat lifts have been provided for raising a boat above water level adjacent a dock or the like. Normally, the boat lifts have four corner legs each of which have an outer leg member with an inner leg member selectively adjustably slidably mounted therein so that the legs may be adjusted to compensate for irregularities in the bottom of the body of water and which may be adjusted to compensate for variations in the water level in which the lift is positioned. Normally, the inner leg members are adjusted with respect to the outer leg members by means of a pin extending through the outer leg member and one of several vertically spaced openings formed in the inner leg member. However, those adjustment pins are normally located beneath the water surface of the water in which the boat lift is positioned which requires that a person must dive into the water to gain access to the adjustment pins.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An apparatus for adjusting the length of a leg of a boat lift is described with the boat lift leg having a tubular outer leg member, with upper and lower ends, and a tubular inner leg member, with upper and lower ends, slidably received therein with the lower end of the inner leg member having a support pad mounted thereon. The apparatus comprises an elongated hollow tube, having upper and lower ends, which is positioned adjacent the leg and disposed in a parallel relationship thereto. The lower end of the tube is secured to the inner leg member by means of a bolt, pin or the like extending through the lower end of the tube and through one of the openings in the inner leg member. An internally threaded member is secured to the tube at the upper end thereof and an elongated, externally threaded shaft, having upper and lower ends, threadably extends downwardly through the internally threaded member into the tube. The upper end of the shaft is positioned above the upper end of the tube. A bracket is secured to the outer leg member and extends laterally therefrom above the upper end of the tube. The shaft extends upwardly through the bracket so that the upper end of the shaft is positioned above the bracket. An operating nut is fixed to the upper end of the shaft above the bracket. A locking collar is fixed to the shaft below the bracket whereby rotation of the operating nut in a first direction will cause the outer leg member to move upwardly with respect to the inner leg member and whereby rotation of the operating nut in a direction opposite to the first direction will cause the outer leg member to move downwardly with respect to the inner leg member. The operating nut is positioned above the surface of the body of water in which the boat lift is positioned so that it is not necessary to enter the water to adjust the length of the legs of the boat lift. Normally, an apparatus of this invention will be secured to each of the four corner legs of the boat lift. The apparatus is selectively removably secured to the boat lift leg so that it may be sold as an after market apparatus.

It is therefore a principal object of the invention to provide an apparatus for adjusting the length of a boat lift leg.

A further object of the invention is to provide an apparatus of the type described which is selectively removably secured to a leg of the boat lift.

A further object of the invention is to provide an apparatus of the type described which may be actuated without entering the water in which the boat lift is positioned.

A further object of the invention is to provide an apparatus of the type described which may be attached to each of the legs of a boat lift without extensive modification of the existing legs of the boat lift.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
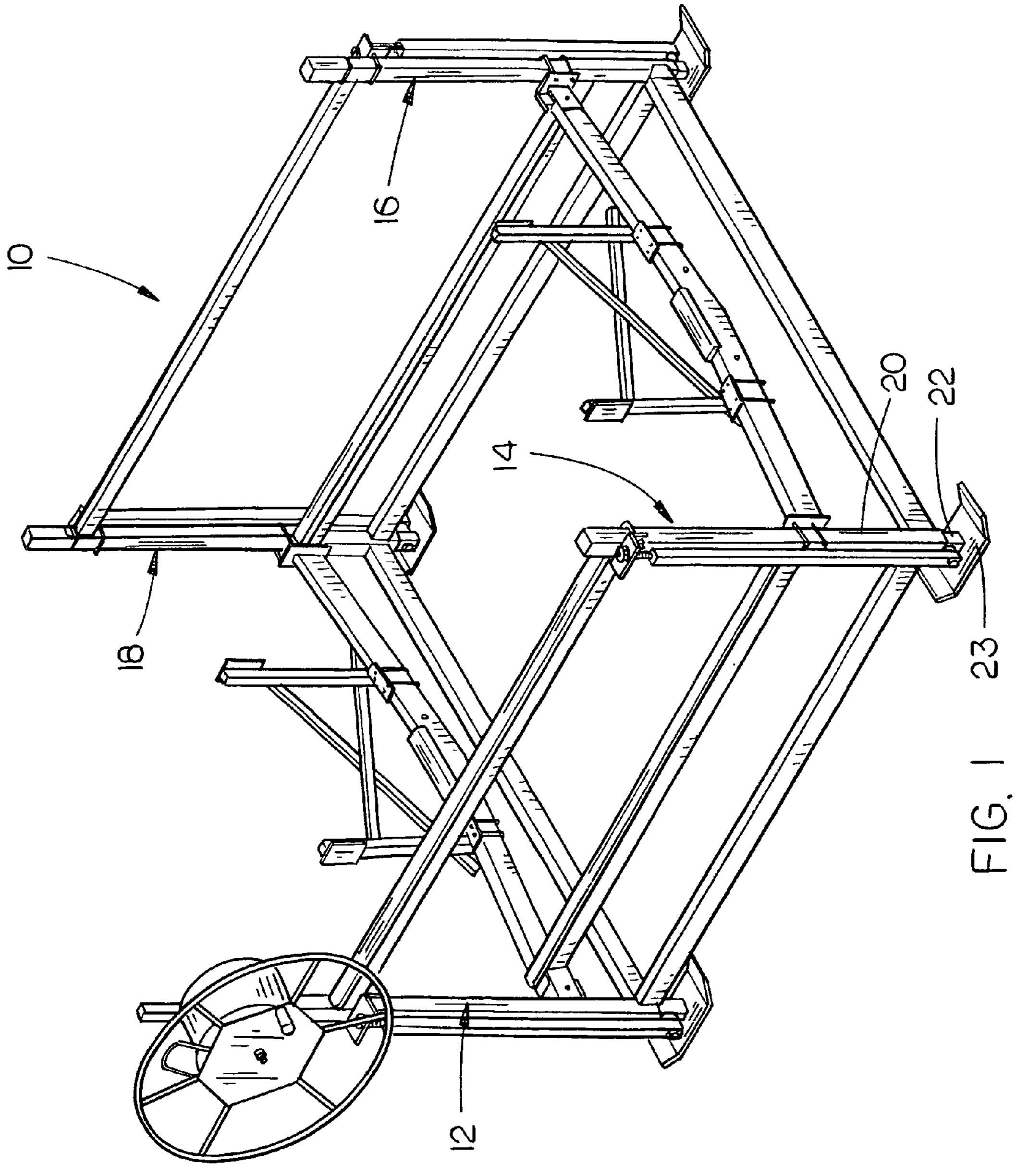
FIG. 1 is a perspective view of a conventional boat lift having an apparatus of this invention secured to each leg thereof.
Figure 2:
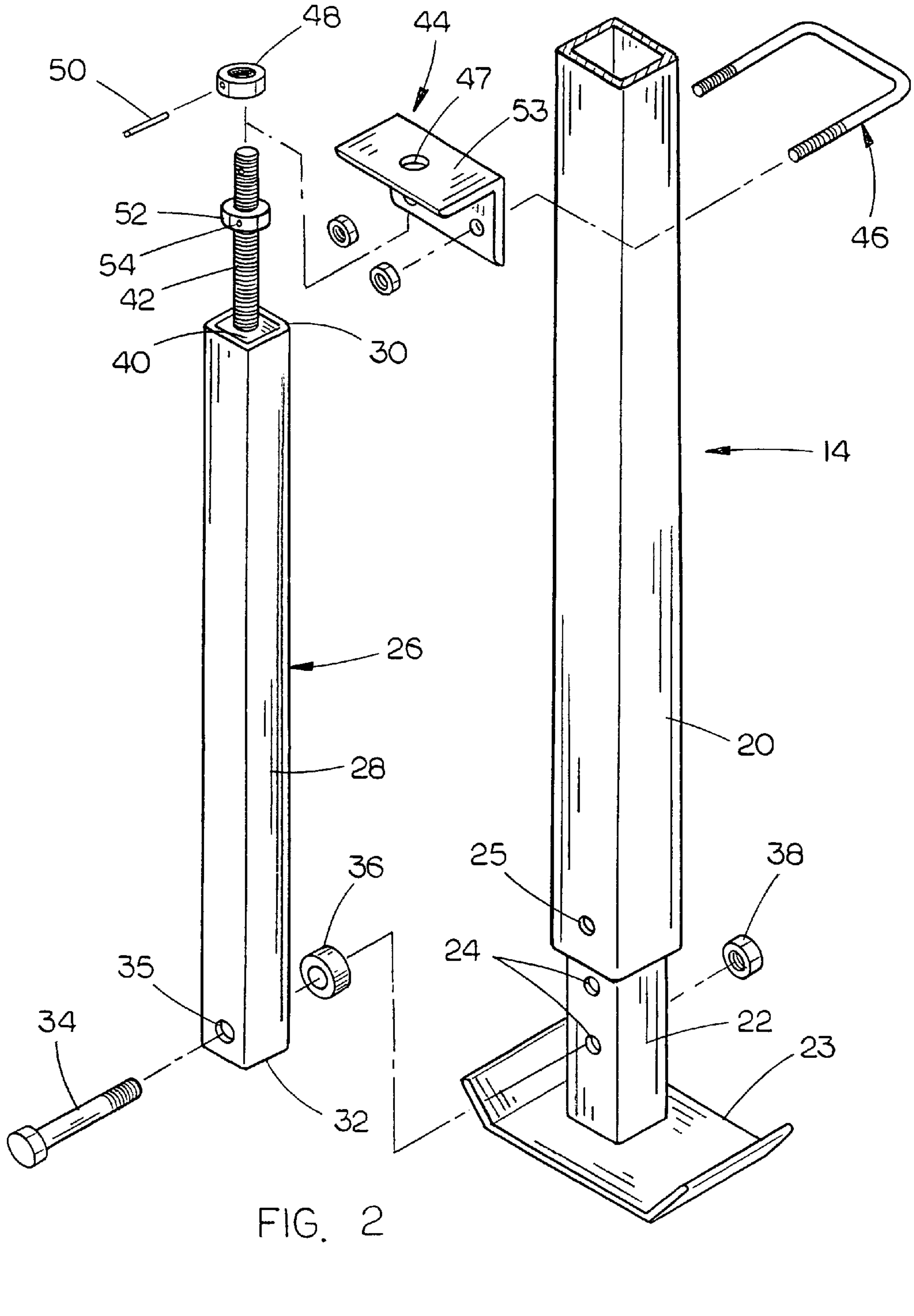
FIG. 2 is an exploded perspective view of the apparatus of this invention and its relationship to a leg of the boat lift.
Figure 3:
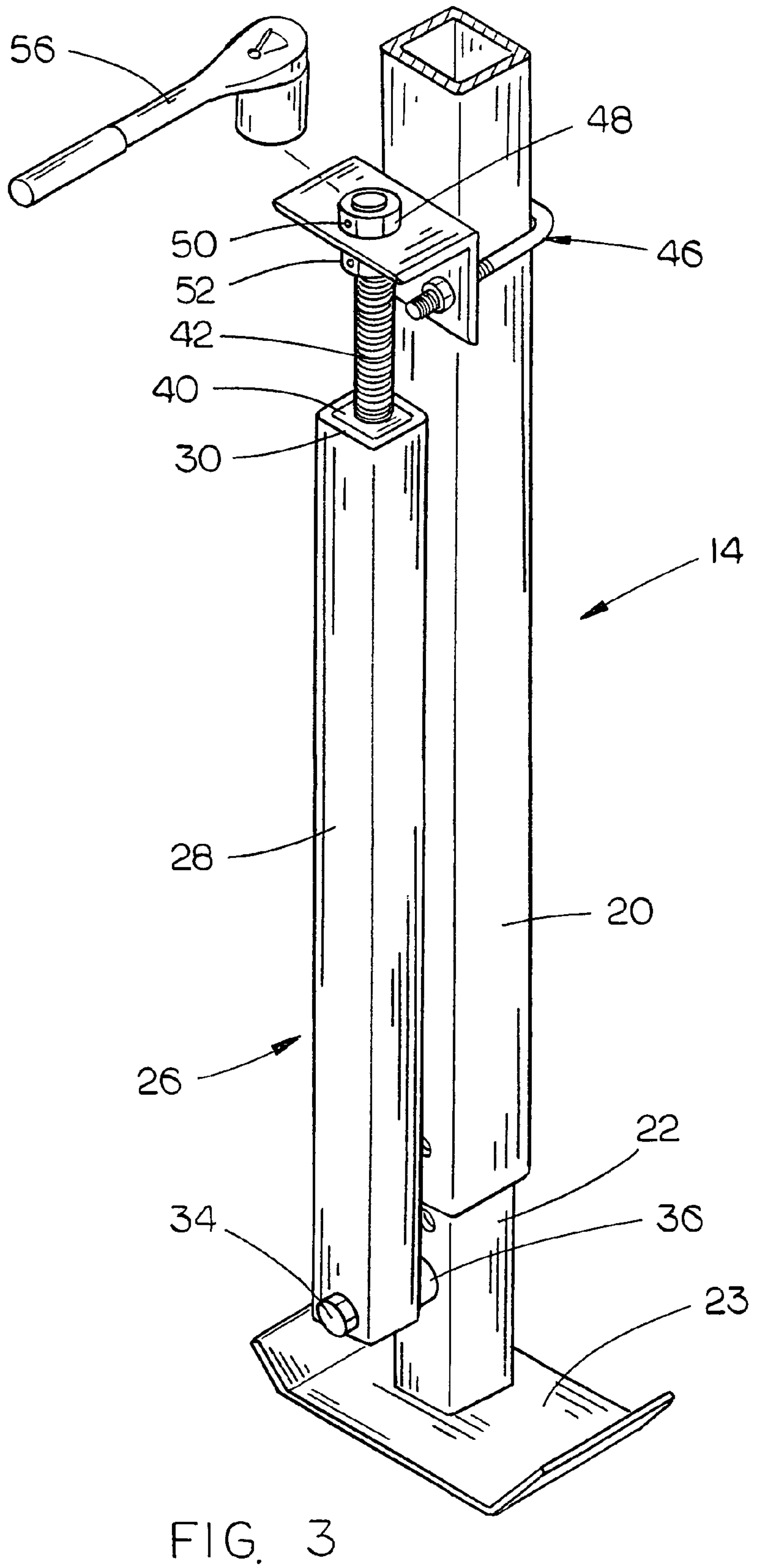
FIG. 3 is a perspective view illustrating the apparatus of this invention mounted on a leg of the boat lift.
Figure 4:
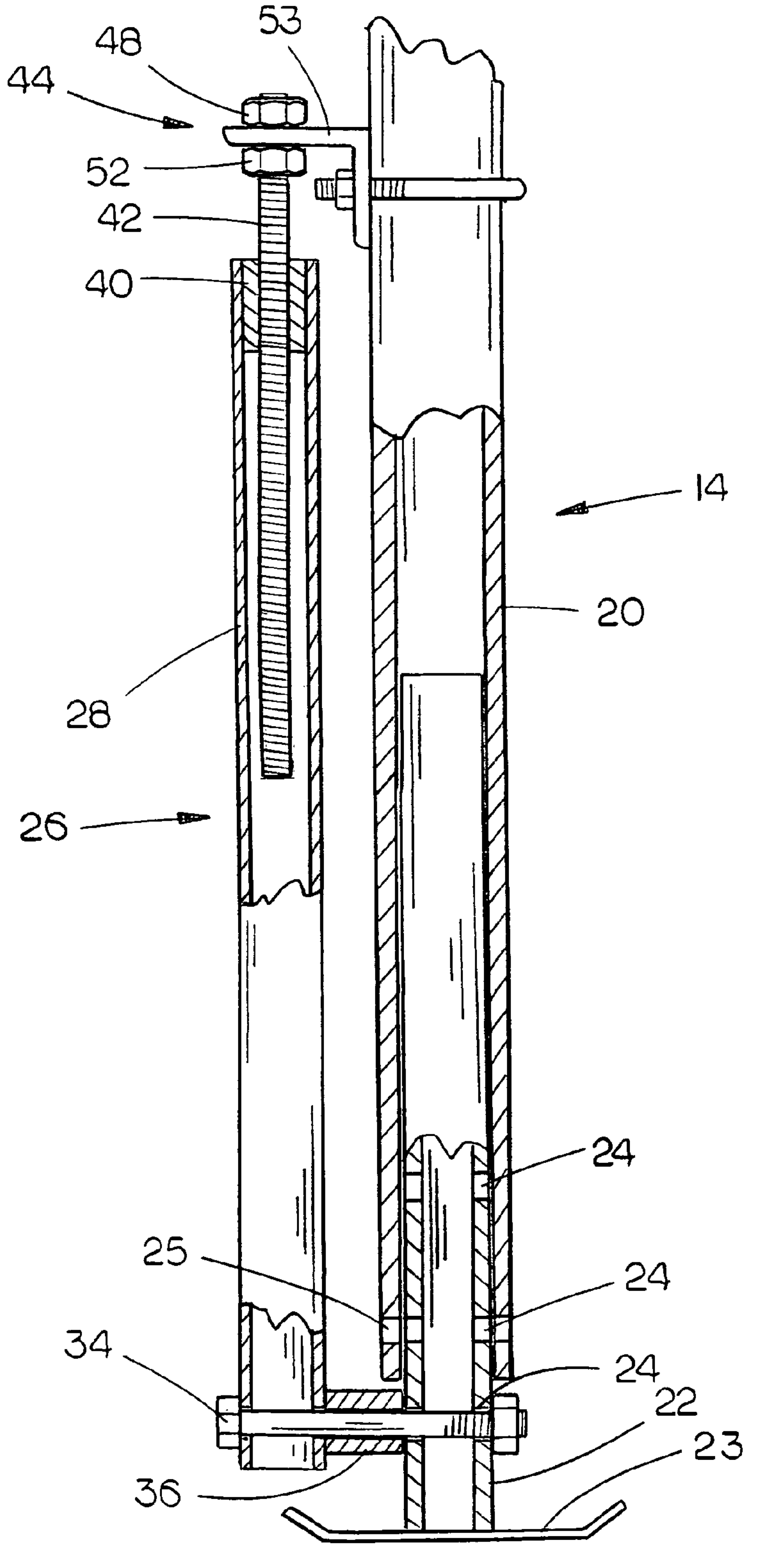
FIG. 4 is a partial sectional view of the apparatus of this invention mounted on a leg of the boat lift.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional boat lift having adjustable legs 12, 14, 16 and 18 at the corners thereof. Each of the legs includes an outer tubular leg portion 20 which telescopically receives an inner tubular leg portion 22 having a pad, foot or shoe 23 mounted on the lower end thereof. A plurality of vertically spaced-apart openings 24 are formed in the lower end of leg portion 22. Normally, outer leg portion 20 has an opening 25 formed therein adapted to receive a pin or the like therein which is received by one of the openings 24 to adjust the length of the leg to accommodate various water levels and water bottoms. Usually, the pin is positioned below the surface of the water which means that any adjustment of the length of the leg must be accomplished under water. It is to this conventional structure that Applicant has devised an apparatus to enable the lengths of the legs to be adjusted without entering the water.

Applicant's leg length adjustment apparatus is referred to generally by the reference numeral 26. The apparatus 26 is normally attached to each of the legs 12, 14, 16 and 18 as seen in FIG. 1. Apparatus 26 includes a vertically disposed hollow metal tube 28 which may have a cylindrical cross-section or a square cross-section. For purposes of description, tube 28 will be described as having an upper end 30 and a lower end 32. Bolt or pin 34 is mounted in the opening 35 in the lower end 32 of tube 28 and is received by one of the openings 24 and preferably the lowermost opening 24 in inner leg portion 22. If the opening 24 is not large enough to accommodate the bolt 34, the opening 24 is enlarged with a drill or the like. A spacer 36 is mounted on bolt 34 between inner leg portion 22 and tube 28 and a nut 38 is secured to the end of bolt 34.

An internally threaded collar or nut 40 is positioned in the upper end of tube 28 and is secured thereto by welding or the like. An elongated threaded rod or shaft 42 is threadably received by the collar 40 and extends downwardly into tube 28 as seen in the drawings. An angular bracelet 44 is secured to outer leg portion 20 by a U-bolt 46 or the like. Shaft 42 extends upwardly through opening 47 in bracket 44 and has an operating nut 48 secured to the upper end thereof by a pin or set screw 50 so that rotation of nut 48 causes shaft 42 to be rotated. A locking collar 52 is secured to shaft 42 below the horizontal portion 53 of bracket 44 by a pin or set screw 54 so that collar 52 rotates with rod 42. Nut 48 and collar 52 limit the amount of vertical movement of rod 42 with respect to bracket 44.

In use, the owner of the conventional boat lift who desires to be able to adjust the length of one or more of the legs 12, 14, 16 and 18 without entering the water will purchase one or more, and usually four, of the apparatuses 26. Each of the apparatuses 26 will be attached to one of the legs in the manner disclosed above while the boat lift 10 is out of the water after the apparatuses have been attached to the legs, the boat lift is placed in the water. When it is desired to adjust the length of the leg to which the apparatus 26 is attached, nut 48 will be rotated with a wrench such as a ratchet wrench 56 or a power tool. Rotation of the nut 48 in one direction will cause shaft 42 to be rotated which causes outer leg portion 20 to be raised with respect to the inner leg portion 22 of the leg. Rotation of the nut 48 in an opposite direction will cause shaft 42 to be rotated in an opposite direction which causes outer leg portion 20 to be lowered with respect to inner leg portion 22. The length of each of the legs is therefore adjustable without the person entering the water since the nut 48 will be above the surface of the water.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. An apparatus for adjusting the length of a leg of a boat lift with the leg having a tubular outer leg member with upper and lower ends and a tubular inner leg member with upper and lower ends, slidably received therein, the lower end of the inner leg member having a support pad mounted thereon, comprising:

an elongated hollow tube having upper and lower ends positioned adjacent the leg and disposed parallel thereto;

said lower end of said tube being secured to said inner leg member;

an internally threaded member secured to said tube at the upper end thereof;

an elongated, externally threaded shaft, having upper and lower ends, threadably extending downwardly through said internally threaded member into said tube;

said upper end of said shaft being positioned above said upper end of said tube;

a bracket secured to said outer leg member and extending laterally therefrom above said upper end of said tube;

said shaft extending upwardly through said bracket so that said upper end of said shaft is positioned above said bracket;

an operating nut fixed to said upper end of said shaft above said bracket;

and a locking collar fixed to said shaft below said bracket whereby rotation of said operating nut in a first direction will cause said outer leg member to move upwardly with respect to said inner leg member and whereby rotation of said operating nut in a direction opposite to said first direction will cause said outer leg member to move downwardly with respect to said inner leg member.

2. The apparatus of claim 1 wherein said tube is selectively removably secured to said inner leg member and wherein said bracket is selectively removably secured to said outer leg member.

3. The apparatus of claim 1 wherein the inner leg member has a plurality of vertically spaced openings formed therein and wherein said lower end of said tube is secured to said inner leg member by an elongated fastener secured to said tube which is received by one of said openings.

4. The apparatus of claim 3 wherein said fastener comprises a bolt and nut fastener.

5. The apparatus of claim 3 wherein a spacer is positioned on said fastener between the inner leg member and said tube.

6. The apparatus of claim 1 wherein a U-bolt means secures said bracket to said outer leg member.

* * * * *